United States Patent [19]
Sastry et al.

[11] Patent Number: 4,811,766
[45] Date of Patent: Mar. 14, 1989

[54] EXPLOSIVELY BONDED EXPANDED STRUCTURE

[75] Inventors: Shankar M. Sastry, Chesterfield; Richard J. Lederich, Des Peres, both of Mo.

[73] Assignee: McDonnell Douglas Corporation, St. Louis, Mo.

[21] Appl. No.: 107,404

[22] Filed: Oct. 8, 1987

[51] Int. Cl.$^4$ .............................................. C22F 1/04
[52] U.S. Cl. ........................... 148/11.5 A; 148/11.5 Q; 148/12.7 A; 420/902
[58] Field of Search ...................... 148/11.5 A, 11.5 Q, 148/12.7 A; 420/902

[56] References Cited

U.S. PATENT DOCUMENTS

| | | |
|---|---|---|
| 3,024,526 | 3/1962 | Phillipchuk ........................... 29/470 |
| 3,066,390 | 12/1962 | Jack ..................................... 29/157.3 |
| 3,331,121 | 7/1967 | De Maris et al. ..................... 29/475 |
| 3,344,510 | 10/1967 | Kameishi et al. .................. 29/470.1 |
| 3,449,819 | 6/1969 | Blank .................................. 29/470.9 |
| 3,543,382 | 12/1970 | Riegelmayer ........................ 29/486 |
| 3,735,476 | 5/1973 | Deribas et al. ..................... 29/470.1 |
| 3,927,817 | 12/1975 | Hamilton et al. .................... 228/157 |
| 4,021,901 | 5/1977 | Kleine et al. ........................ 29/157.3 |
| 4,264,029 | 4/1981 | Henne et al. ......................... 228/108 |
| 4,415,375 | 11/1983 | Lederich et al. .................. 148/11 F |

Primary Examiner—R. Dean
Attorney, Agent, or Firm—Cohn, Powell & Hind

[57] ABSTRACT

A method of superplastically forming aluminum alloy composites employs explosive bonding to produce strong, consistent bonds and annealing treatment to produce a fine microstructure in the bonded alloy sheets. The bonded alloy sheets having the fine microstructure can then be formed by superplastic methods to produce complex parts and structural elements.

12 Claims, 2 Drawing Sheets

EXPLOSIVELY BONDED EXPANDED STRUCTURE

BACKGROUND AND SUMMARY OF THE INVENTION

Aluminum and aluminum alloys are extremely valuable and have achieved wide spread use in all applications where light weight and high strength to weight ratio are important. The transportation industry including aircraft and other uses particularly find aluminum alloys highly useful. Many techniques of fabrication have been used for aluminum and aluminum alloys. One such technique is the superplastic forming technique. In order to fully take advantage of the desirable strength and weight properties of aluminum it is desirable in many instances to utilize superplastic forming techniques. Aluminum can be formed into complex parts by the additional technique of superplastic forming. By complex parts we mean parts having a shape of such complexity that they can not readily be formed by standard casting, molding, forging, machining and welding techniques.

Superplastic forming is typically used by forming sheet stock of between about 0.040 to 3/16 inches in thickness or more preferably between about 0.060 to 0.125 inches in thickness. In superplastic forming a die having a desired shape may be used. A piece of stock aluminum or aluminum alloy such as sheet stock is introduced into the die and pressure is exerted on one side of the stock and reduced on the other side to conform the shape of the sheet stock to the shape of the die. In another technique two or more sheets of aluminum may be bonded together and then inflated for example as held in a suitable die, as shown in FIG. 3. As the sheets are inflated the shape and thickness of the sheet material change and it becomes a more complex shape such as a honeycomb or other shape.

These superplastically formed shapes or parts can be used as structural elements or can be a final part in themselves. For example honeycomb sheeting may be used as structural elements and subject to additional fabrication when incorporated into the end products as a an aircraft frame or wing structure.

The superplastic method of forming allows these complex shape parts to be formed and manufactured in a way that can take advantage of the inherently high strength to weight ratios possessed by aluminum and aluminum alloys. However, there are limitations in this fabrication method. Particularly as concerns the use of aluminum and aluminum alloys, for example, it is difficult to produce laminated or honeycomb structures from aluminum sheets and plates since it is difficult to obtain suitable bonds between adjacent sheets by conventional techniques. The presence of the oxide on the surface of aluminum reduces the ability of aluminum parts to be bonded together to produce a strong bond. For example by the difusion bonding or rolling bonding method. Conventional bonding techniques interfere with the fine grain structure which is required to fabricate aluminum by the superplastic method. Welding or brazing techniques for example, due to the use of heat, disrupt the fine grain structure of the aluminum stock causing coarsening of the grain structure. The coarse grain structure destroys or severely restricts the ability of the parts to be formed by the superplastic method subsequent to such bonding techniques.

Other bonding techniques such as adhesive bonding also are restricted in their applicability to the superplastic forming method primarily due to weakness of the bond and difficulty of achieving the bond in the desired patterns in many cases. Where the bond is not sufficiently strong the peel stress on the bond area produced by superplastic forming may be sufficient to destroy the bond in the localized area and thus render the parts unsuitable for their intended use. While it is known to use clamping techniques at bond nodes to compensate for the inherent weakness of adhesive bonding, this technique is severely limited. It cannot be conveniently used for many large parts or structural elements and requires additional labor, set up time and capital requirements.

Removing oxide film on the bond area of aluminum sheeting prior to bonding by the diffusion method has also been tried but it also has not proved satisfactory particularly for production of larger parts and structural elements. The increased labor and capital cost required and the difficulty of achieving and maintaining clean, oxide free, surfaces throughout the bonding process has restricted the use of diffusion bonding.

Applicants have discovered an improved method of superplastically forming parts and structural elements from aluminum sheets and the like. Applicants are able to achieve a strong peel resistant bond in the joined aluminum elements by explosively bonding he elements together. Applicants are also able to overcome the grain disrupting effects of the explosive bonding technique and produce a joined structure having the fine microstructure necessary for superplastic forming for example by expansion into honeycomb structures. In particular, applicants have found that by subjecting aluminum stock to an annealing treatment followed by explosive bonding and then to a subsequent annealing treatment that they can produce superplastically formed aluminum parts which have superior bond strength, which do not require additional clamping operations to hold the bonded areas together during the expansion which occurs in superplastic forming and which do not require that the surfaces be free of the oxide film normally present thereon.

Applicants' are aware of the following U.S. patents the disclosures of which are incorporated by reference herein: U.S. Pat. Nos. 3,024,526; 3,066,390; 3,331,121; 3,344,510; 3,449,819; 3,543,382; 3,735,476; 3,927,817; 4,021,901; 4,264,029 and 4,415,375.

Applicants' method results in superplastically formed aluminum and aluminum alloy parts which are extremely light in weight. The parts or structural elements formed may be produced at higher production rates and at lower costs than would have been permitted by use of previous techniques. Moreover, the bonds between adjacent element in the super plastically formed parts or structures are stronger and more uniform.

The invention will be more apparent from the following detailed description of the preferred embodiments and the drawings.

DESCRIPTION OF THE PREFERRED EMBODIMENTS

Applicants are concerned chiefly with a greatly improved method of superplastic forming of aluminum alloys. Applicants are particularly concerned with the production of complex structures and parts from aluminum by superplastic forming, for example by expanding bonded elements into complex structures. Superplastic forming typically requires the construction of precursor forms by bonding together individual aluminum elements such as aluminum sheets and by superplastically expanding the bonded sheets to form a complex structure such as a honeycomb construction.

Superplastic forming of aluminum requires fine grained microstructure, as is known. Bonding of the individual elements in a composite, particularly by the use of heat as in welding and brazing, changes the microstructure of the aluminum and therefore is not suitable as a bonding method. Diffusion bonding is inhibited by the presence of the aluminum oxide at the surface of the aluminum sheet. Roll bonding is similarly inhibited. As a result, diffusion and roll bonding methods are not suitable or are restricted in their application.

Figure 1:
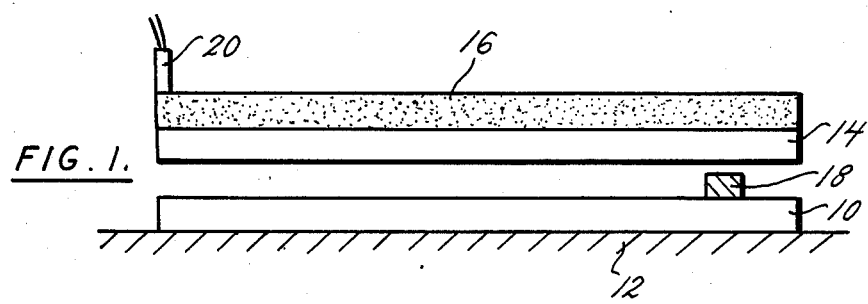
FIGS. 1 and 2 are schematic views of the arrangement of elements for explosive bonding.
Figure 2:
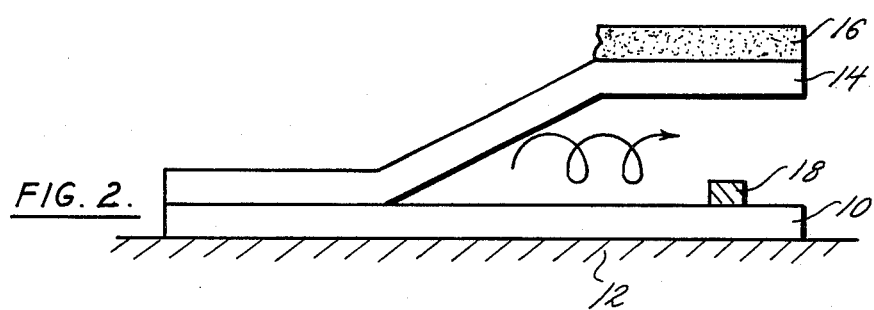

However, applicants have discovered that suitable bonding may be achieved by the use of explosive bonding techniques in which a plurality of aluminum sheets may be bonded at distinct areas by explosive pressure driving the sheets together. The areas which are not to be bonded are protected by a stop weld, for example plastic paint, as is known in the art. As shown by the configuration in FIG. 1 and FIG. 2, explosive bonding may be achieved by using a parallel plate arrangement in which a base plate 10 is held on a stationary anvil 12. A flier plate 14 is initially parallel to and spaced apart from the base plate 10. The flier plate 14 may be disposed at a slight angle. A low detonation velocity explosive 16, such as ammonium nitrate prills with 11½% diesel oil is placed on the flier plate. The areas to be left unbonded are covered with a layer of plastic paint as a stop weld. The explosive when detonated produces a pressure normal to the flier plate and as the explosion proceeds it drives the flier plate against the base plate. This high velocity, high pressure collision effaces the surface oxide films and the result is that clean surfaces come into intimate contact under extreme pressures to form a strong bond. By correlating the particular explosive used, the angle of collision and the collision velocities with appropriate stop welds, very complex and sound bonds can be produced between a plurality of plates. Typically very little bulk heating occurs and hence the joints are relatively free of metallurgical problems associated with conventional welding practice.

Moreover, by using the method as disclosed herein a consistantly fine microstructure can be maintained in the aluminum so that it may be consistently superplastically formed. The bonds produced possess excellent mechanical properties. Explosively bonded peel strength and shear strength are greatly superior to those obtained by roll bonding and by adhesive bonding. A bonded sample produced as described herein was subjected to a peel force of 11 N/mm (60 pounds per inch) at 520° C. for one hour. This load exceeds that which would be required for superplastic forming applications. No peel was observed at the bond. Table 1 shows comparative bond strengths. The test demonstrated that the explosively bonded sheets can possess good formability. For comparative purposes Table 1 also shows comparable values for adhesive bonding and roll bonding. The aluminum material used in the comparison of Table 1 was conventional ingot 7475 aluminum alloy sheet bonded and treated as disclosed herein.

Figure 3:
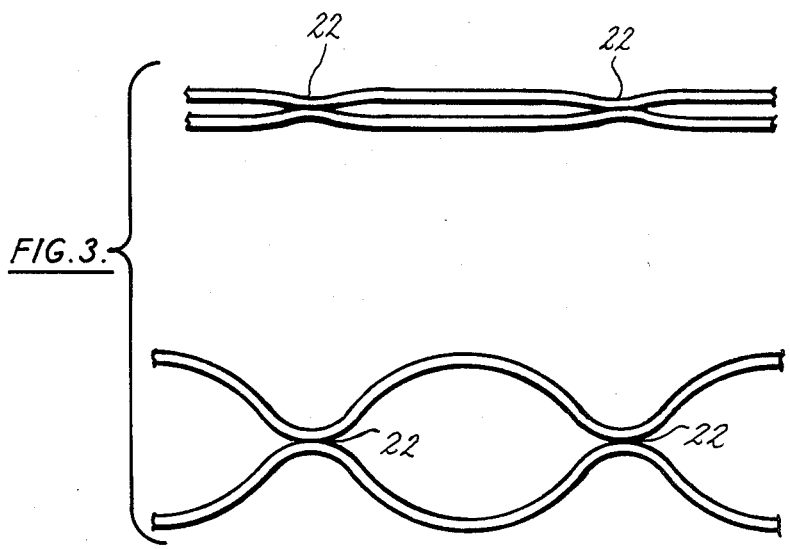
FIG. 3 is the schematic view of superplastic forming by expansion of honeycomb bonded structures.
Figure 4:
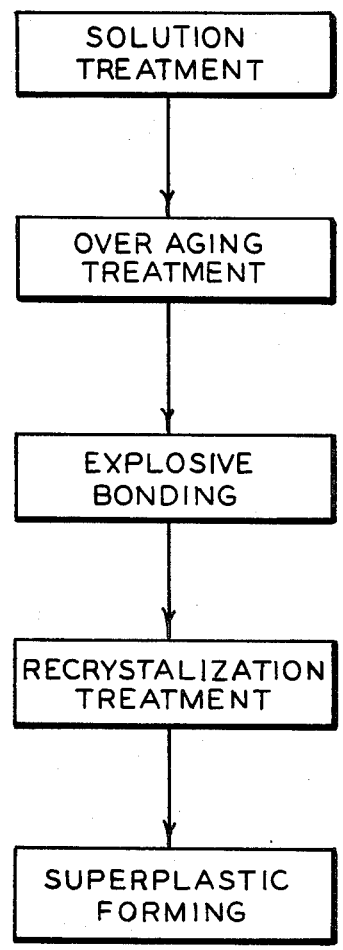
FIG. 4 is a flow chart of applicants' process of superplastically forming aluminum using explosive bonding and maintaining the required fine microstructure by heat treating the aluminum.

Explosive bonding is easiest with fully annealed samples. However, when such bonded sheets are heated to the superplastic forming temperatures a very coarse microstructure results. This is because the explosively bonded microstructure is heavily deformed. The microstructure is similar to that produced by a great deal of cold working in spite of the fact that the bonding thickness reduction is only a few percent. Applicants have found that this heavily deformed microstructure may be rendered suitable for superplastic forming by the proper pre-treatment and post-treatment to the explosive bonding. This treatment including forming is shown schematically in FIG. 3, it includes a solution and over age treatment to precipitate micron-size particles in the aluminum matrix. For example, prior to bonding the aluminum sheets are given a solution heat treatment anneal of between about 450° to 530° C. for between about 0.5 and 10 hours, for example at about 480° C. for about one hour. This is followed by an over aging anneal at temperatures of between about 350° to 425° C. for between about 1 to 20 hours, that is preferably at about 400° C. for about 6 hours. The treated sheets are then explosively bonded, as is known in the art and described herein. Following the bonding the structure is given a recrystalization anneal, for example between about 450° to 530° C. for between about 0.5 to 10 hours, preferably about 480° C. for about 1 hour, in a salt bath or other highly conductive medium. The use of a highly conductive medium permits the material to reach the annealing temperature, for example about 480° C., very rapidly. The annealing temperature is reached as rapidly as possible, for example, within five minutes or less and more preferably, three minutes or less.

The result of these three annealing treatments is to yield bonded sheets having very fine superplastically formable microstructure and having a strong, dependable bond. The bonded sheets may be superplastically formed by conventional means for example by placing in a suitable die, heating to the forming temperature, typically between about 480° to 525° C. and expanding the structure by utilization of internal gas sources to form a structure, as is known in the art. As shown by applicants' Table 1, bonds produced by this method are excellent with no indication of voids, unbonded regions, or oxide particles and having a highly superior bond strength. In particular the peel and shear strengths are greatly superior to those obtained by roll bonding and adhesive bonding. While the material shown in Table 1 was conventional 7475 ingot aluminum alloy sheets of 0.060 inches thickness, the method disclosed herein is applicable to all superplastically formable and heat treatable aluminum alloys, both ingot and powder forms.

It will be apparent to those skilled in the art that many variations and departures from the specific alloys and conditions described herein may be made without departing from the spirit and essential characteristics of the invention. The specific embodiments are to be considered in all their aspects and are for purposes of illustration and are not restrictive of the scope of the invention. The scope of the invention herein is to be determined by the claims which are appended hereto and their equivalents.

| STRENGTH COMPARISONS OF BONDED JOINTS AL 7475 T6 Heat Treatment | | |
|---|---|---|
| | Peel Strength [N/mm (lb/in)] | Shear Strength [MPa (ksi)] |
| Roll Bonding | 23.8 (131) | 117 (17.0) |
| Adhesive Bonding | 4–10 (22–60) | 7–35 (1–5) |
| Explosive Bonding | 51 (290) | 260 (37.7) |

We claim:

1. A method of superplastically forming aluminum composite structures comprising subjecting aluminum stock elements to a heat treatment, explosively bonding a plurality of the stock elements into a unitary structure, subjecting the unitary structure to a second heat treatment, the combination of heat treatments being effective to provide a superplastically formable fine microstructure in the bonded unitary structure and superplastically forming the bonded unitary structure into a complex shape, the explosive bonding being effective to produce a strong, peel resistant bond, between the stock elements, the bond being effective to maintain the unitary condition of the bonded structure during superplastic forming.

2. The method of claim 1 wherein the aluminum stock elements are subjected to a plurality of heat treatments prior to bonding.

3. The method of claim 1 wherein the aluminum stock elements are subjected to a solution heat treatment of between about 450° to 530° C. prior to bonding.

4. The method of claim 3 wherein the heat treatment is conducted for between about 0.5 to 10 hours.

5. The method of claim 1 wherein the aluminum stock elements are subjected to an over aging heat treatment of between about 350° to 450° C.

6. The method of claim 5 wherein the over aging heat treatment is conducted for between about 1 to 20 hours.

7. The method of claim 1 wherein the bonded unitary structure is subjected to a heat treatment of between about 450° to 530° C..

8. The method of claim 7 wherein the heat treatment is conducted for between about 0.5 to 10 hours.

9. The method of claim 8 wherein the heat treatment is a recrystalization annealing treatment and wherein the temperature of the unitary bonded structure is rapidly raised to the temperature of treatment.

10. The method of claim 9 wherein the temperature of the unitary bonded structure is raised to the treating temperatures in five minutes or less by immersing the structure in a highly conductive medium.

11. The method of claim 9 wherein the temperature of the unitary bonded structure is raised to the treating temperature in three minutes or less by immersing the structure in a salt bath.

12. The method of claim 1 wherein the aluminum stock elements are subjected to a solution heat treatment of about 480° C. for about one hour followed by a subsequent over aging treatment of about 400° C. for about six hours and wherein the bonded unitary structure is given a recrystalization treatment of about 480° C. for about one hour.

* * * * *